United States Patent
Schrader et al.

(10) Patent No.: US 8,795,757 B2
(45) Date of Patent: Aug. 5, 2014

(54) COMPOSITIONS WITH A SURFACTANT SYSTEM COMPRISING SAPONINS, AND LECITHIN

(75) Inventors: Dirk Schrader, Holzminden (DE); Cornelia Homner, Holzminden (DE); Christopher Sabater-Lüntzel, Holzminden (DE)

(73) Assignee: Symrise AG, Holzminden (DE)

( * ) Notice: Subject to any disclaimer, the term of this patent is extended or adjusted under 35 U.S.C. 154(b) by 72 days.

(21) Appl. No.: 13/574,143

(22) PCT Filed: Jan. 24, 2011

(86) PCT No.: PCT/EP2011/050908
§ 371 (c)(1),
(2), (4) Date: Sep. 5, 2012

(87) PCT Pub. No.: WO2011/089249
PCT Pub. Date: Jul. 28, 2011

(65) Prior Publication Data
US 2013/0004621 A1    Jan. 3, 2013

Related U.S. Application Data

(60) Provisional application No. 61/297,457, filed on Jan. 22, 2010.

(30) Foreign Application Priority Data

Jan. 22, 2010 (EP) .................................. 10151491

(51) Int. Cl.
*A23D 7/00* (2006.01)
*A23L 2/00* (2006.01)

(52) U.S. Cl.
USPC .......................................... 426/602; 426/590

(58) Field of Classification Search
USPC ................................. 426/602–604
See application file for complete search history.

(56) References Cited

U.S. PATENT DOCUMENTS

| 4,481,185 | A | * | 11/1984 | Grollier et al. | .................. | 424/59 |
| 5,057,540 | A |   | 10/1991 | Kensil et al. | | |
| 8,318,233 | B2 | * | 11/2012 | Tran et al. | ..................... | 426/602 |

FOREIGN PATENT DOCUMENTS

| EP | 1533313 A1 | | 5/2005 |
| JP | 63157934 | * | 6/1988 |
| JP | 63233761 | * | 9/1988 |
| JP | 2004-065128 | * | 3/2004 |
| JP | 2006055137 A | | 3/2006 |
| JP | 2006249037 A | | 9/2006 |
| WO | WO-2007026271 A1 | | 3/2007 |

OTHER PUBLICATIONS

Merory, J. 1960. Food Flavorings. AVI Publishing Company, Inc. Westport, CT. p. 57-62.*
Secondini, O. 1990. Handbook of Perfumes and Flavors. Chemical Publishing Co., Inc. New York. p. 56, 57, 209-213.*
International Search Report with references cited and Written Opinion under Rule 43 PCT attached to the Search Report, International Application No. PC/EP2011/050908.

* cited by examiner

*Primary Examiner* — Carolyn Paden
(74) *Attorney, Agent, or Firm* — Novak Druce Connolly Bove + Quigg LLP

(57) ABSTRACT

Described is a composition comprising
(i) an aqueous phase comprising
water,
one, two or more co-solvents selected from the group consisting of propylene glycol, ethanol, triacetin, and glycerol, and
optionally one, two or more sugars, preferably selected from the group consisting of sucrose, fructose, and glucose,
(ii) a surfactant system comprising
one saponin or a mixture of two, three or more saponins, and
lecithin,
and
(iii) an oil phase comprising (or consisting of)
one, two, three or more substances selected from the group consisting of flavorants, vitamins, coloring foodstuffs, and polyunsaturated fatty acids,
wherein the composition does not comprise a polyclycerol fatty acid ester.
Further described is a method of preparing such composition and a corresponding food formulation.

19 Claims, No Drawings

US 8,795,757 B2

COMPOSITIONS WITH A SURFACTANT SYSTEM COMPRISING SAPONINS, AND LECITHIN

CROSS REFERENCE TO RELATED APPLICATIONS

This application is a National Phase filing under 35 U.S.C. §371 of International Application No. PCT/EP2011/050908, filed Jan. 24, 2011, which claims priority to European Application No. 10151491.7 and U.S. Provisional Application No. 61/297,447, both filed on Jan. 22, 2010. The entire contents of each of the above-applications are incorporated herein by reference.

BACKGROUND OF THE INVENTION

The present invention relates to a composition comprising an aqueous phase, a surfactant system and an oil phase. The surfactant system comprises one or more saponins, and lecithin.

The invention furthermore relates to a corresponding method of preparing a composition. Finally, the present invention relates to food formulations comprising a composition according to the present invention or obtainable according to a method of the present invention.

Compositions comprising an aqueous phase and an oil phase as well as a surfactant system are routinely used in the form of emulsions for making beverages. Typically, such compositions (beverage emulsions) comprise an aqueous phase comprising water, optionally one or more co-solvents and further ingredients. Within that aqueous phase an oil phase is dispersed in the form of microscopic droplets. The dispersed oil phase typically comprises flavorants (typically in the form of flavor oils) and optionally further lipophilic ingredients which are insoluble or only soluble to a very limited extent in the aqueous phase.

Compositions (like beverage emulsions) comprising an aqueous phase and an oil phase dispersed therein typically comprise a surfactant system which itself comprises one or more surfactants (emulsifying agents).

In particular when used for the preparation of beverages, compositions (emulsions) of the above described type have to meet a number of requirements. The emulsion must be stable, both in concentrated and in diluted (i.e. beverage) form. This stability should be maintained over a wide range of temperature and storage conditions. Furthermore, the emulsions should be simple to formulate and to incorporate into beverages.

As outlined in the literature, emulsion-type compositions for making beverages and other liquid foods are thermodynamically instable and therefore tend to separate into there original two phases (aqueous phase and oil phase). With respect to beverages, "ringing" and "sedimentation" are the typical effects associated with phase separation of an emulsion type composition. "Ringing" is the formation of a (whitish) ring around the neck of the beverage container, "sedimentation" is the precipitation of material at the bottom of the container.

Numerous emulsifiers have been tested and used in emulsion-type compositions for making beverages. In particular, gum Arabic, modified starch, and pectin have been employed. In an attempt to increase the stability of emulsion-type compositions for the preparation of beverages and other liquid foods microemulsions, i.e. emulsions comprising very small droplets of the dispersed (i.e. oil) phase, have been prepared and used. In addition to being typically more stable microemulsions additionally have the advantage of being transparent or clear when sufficiently diluted. Due to the very small size of the dispersed oil-droplets, which in many cases have a diameter of less than 140 nm, the visible light cannot be scattered. When such microemulsions are used as flavor delivery systems in food products, in particular in beverages, they must fulfill all the requirements discussed above. Additionally, they must of course also meet the various regulatory requirements with regard to their ingredients.

It is extremely difficult to prepare stable beverages comprising flavor oils and in particular citrus oils like lemon, orange and grapefruit oils. For the preparation of clear beverages, e.g. carbonated soft drinks, typically washed flavor oils are used in order to achieve the necessary water solubility. In this process, the unpolar substances of citrus oils (terpenes etc.) are typically washed out of the oil by adding a water/ethanol mix or propylene glycol to the oil. This mixture is slightly stirred and left in a tank at low temperatures of around 4° C. for 48 to 72 hours. A phase separation due to differences in density and polarity takes place. The polar flavor substances are enriched in the water/ethanol mix or in the propylene glycol, respectively, which is decanted from the rest and typically used as water soluble citrus washing to be added to clear soft drinks. This washing process is not very economic, takes in practice at least 3 days for production, and the smell or taste caused by and being characteristic for the unpolar flavor substances of the citrus oil is disadvantageously lost or reduced.

With respect to oil soluble vitamins like tocopherol (vitamin E) and coloring foodstuffs (colors) like carotene, a washing process is not feasible as the whole functional substance (vitamin, color) is needed in the beverage. Therefore, it is not possible to use these functional substances in clear soft drinks unless microemulsions based on emulsifiers like polysorbate are used, which however for certain purposes are not preferred as the emulsifiers are not of natural origin.

It was an object of the present invention to provide compositions which are stable micro-emulsions or can be transformed into stable microemulsions. It was a further object of the present invention to provide compositions that can be used as an oil-soluble-ingredient delivery system for making a food formulation having a certain property provided by the delivered ingredient. It was a particular object of the present invention to provide compositions which are capable of delivering flavorants, polyunsaturated fatty acids, vitamins and/or coloring food stuffs to a food formulation (and in particular to a food formulation being a beverage or a beverage concentrate). It was another object of the present invention to provide compositions which can be prepared in a relatively short period of time and without any complicated process steps.

It was another object of the present invention to provide a method of preparing such compositions. Preferably, it should be possible to conduct the method in a short period of time and without the need of conducting any complicated steps.

It was another object of the present invention to provide food formulations comprising compositions as discussed. In particular, a food formulation being a beverage should be provided which comprises a composition according to the invention and preferably is liquid and clear.

According to a first aspect, the present invention relates to a composition comprising
  (i) an aqueous phase comprising
    water,
    one, two or more co-solvents selected from the group consisting of propylene glycol (1,2-propane diol), ethanol, triacetin (glycerin triacetate), and glycerol, and optionally one, two or more sugars, preferably selected from the group consisting of sucrose, fructose, and glucose,
(ii) a surfactant system comprising
one saponin or a mixture of two, three or more saponins, and
lecithin, and
(iii) an oil phase comprising (or consisting of)
one, two, three or more substances selected from the group consisting of flavorants, vitamins, coloring foodstuffs, and polyunsaturated fatty acids,
wherein the composition does not comprise a polyglycerol fatty acid ester.

DETAILED DESCRIPTION OF THE INVENTION

The composition comprising to the present invention comprises (i) an aqueous phase and (iii) an oil phase which is preferably dispersed within the aqueous phase (oil-in-water-emulsion). Furthermore, the composition of the present invention comprises (ii) a surfactant system which acts as an emulsifier when the oil phase is dispersed within the aqueous phase.

The composition of the present invention either is a microemulsion (with the oil phase being emulsified within the aqueous phase and the surfactant system acting as an emulsifying agent) or the composition can be transformed into a microemulsion, e.g. by passing the composition through a high-pressure homogenizer. In particular, when in the form of a microemulsion the composition of the preset invention can be employed in making clear beverages which are stable against emulsion break-down associated with ringing and/or sedimentation. As such, the composition of the present invention is a delivery system for the substances comprised within the oil phase.

WO 2007/026271 discloses an edible, clear, high flavor oil loaded, thermodynamically stable microemulsion comprising flavor, surfactant system, water and/or a water soluble co-solvent, and optionally a vitamin. The surfactant system is a combination of a sugar ester of fatty acid with lecithin. The use of saponins is not disclosed in WO 2007/026271 A1.

JP 2006-249037 discloses compositions and beverages comprising a complex mixture of surfactants consisting of a combination of lecithin, polyglycerol fatty acid esters and certain saponins. However, polyglycerol esters are synthetic and are often not allowed for use in soft drinks, e.g. in Europe. According to JP 2006-249037, the polyglycerol fatty acid esters are the major component of the surfactant system additionally comprising lecithin and certain saponins.

In the composition of the present invention there is not included any polyglycerol fatty acid ester.

Preferably, the composition according to the present invention is a microemulsion. When in the form a microemulsion, the composition of the present invention has an excellent shelf life stability (typically of at least several months) in the temperature range of from 10° C. to 30° C. If the composition of the present invention is in the form of a microemulsion the average particle size of the droplets of the oil phase dispersed in the aqueous phase is 140 nm or less (as determined by laser diffraction particle size measurement). Surprisingly, in the composition of the present invention the surfactant system can be a two-component system only comprising saponin(s) and lecithin, and the composition can still have a very high stability, if the composition is in the form of a microemulsion.

The term "clear" in the context of the present invention refers to a composition of matter having a turbidity of less than 10 FNU (Formazin Nephelometric Units) as measured according to DIN EN ISO 7027—Water quality—Determination of turbidity (ISO 7027:1999), preferably measured with a Hach Turbidimeter 2100N IS.

Preferably, the composition of the present invention is a clear or opaque microemulsion. In the present text a composition or beverage is considered to be clear if a turbidity of less than 10 FNU is measured according to DIN EN ISO 7027 (water quality—determination of turbidity (ISO 7027:1999). A composition or beverage is considered to be opaque if a turbidity in the range of from 10 to 250 FNU is measured according to this determination method.

Particularly good stability results are obtained when in a composition of the present invention the co-solvent is selected from the group consisting of propylene glycol and glycerol, and preferably comprises both propylene glycol and glycerol. A possible explanation for the very positive results is that propylene glycol and glycerol, respectively, interact with the surfactants of the surfactant system of the composition of the present invention.

Preferably, within the surfactant system the saponin or one, two, three or all saponins of said mixture are preferably selected from the group consisting of steroid saponins and triterpene saponins. Triterpene saponins are preferred. Particularly preferred is a composition according to the present invention wherein said saponin of the surfactant system or one, two, three or all saponins of said mixture included in the surfactant system are selected from the group consisting of quillaic saponins. Quillaic saponins (Quillaja saponins) belong to the group of triterpene saponins and have shown particularly good results in experiments regarding the preparation of microemulsions of oil soluble materials such as citrus oils, vitamins, natural colors/coloring food stuffs and fatty acids like polyunsaturated fatty acids.

Quillaic saponins may be obtained from the bark of the so called "soap bark tree", also called Quillaja saponaria molina and sometimes Quillaja saponaria. Most preferred the saponins according to the invention are part of an extract from the bark of the soap bark tree. Preferred extracts used in accordance with the present invention are aqueous, preferably obtained by aqueous extraction of the bark.

Quillaja saponins are natural tensoactives (or surfactants) derived from the tree Quillaja saponaria, indigenous to Chile. They have been used for over 100 years as foaming agents in food and beverages, production of photographic films, adjuvants in animal vaccines, and also in cosmetics.

Preferably, in the context of the present invention a saponin extract, preferably an extract of quillaic acid saponins, is used in the form of an aqueous extract having a content of triterpenic saponins in the range of from 2 to 50 wt. %, preferably in the range of from 5 to 35 wt. %, most preferably in the range of from 10 to 25 wt. %, based on the total mass of the aqueous saponin extract.

The extract of quillaia is used in the manufacture of food additives (number E999). It is used as in baked goods, frozen dairy products, and puddings and as a foaming agent in soft drinks. It also applied in some "natural" spray adjuvant formulations for agricultural uses.

Quillaja saponins are non ionic surfactants, resistant to salt, heat, and extremely stable to acid pH. Chemically they consist of a triterpene, with sugar chains in carbons 3 and 28. Different sugar chains give rise to at least 50 different types of quillaja saponins. Molecular weight is of 1300-2600 Dalton. The molecular weight of preferred quillaja saponins in compositions of the present invention is 1800-2600 Dalton. Particularly preferred is the range from 1800-2000 Dalton. Below 200-500 ppm saponins exist as monomers; above 200-500 ppm they aggregate as micelles, with a molecular weight of approximately 100.000 Dalton.

Regarding the structural elucidation and classification of *Quillaja saponins*, reference is made to the Thesis of Johan Bankefors, 2006, Uppsala, Sweden, ISBN 91-576-7181-8.

The purification of several *Quillaja saponins* is described in U.S. Pat. No. 5,057,540 and U.S. Pat. No. 5,817,314.

Preferably the lecithin used in the surfactant system of a composition according to the present invention is foodgrade lecithin, which (a) is from soy-bean sources and/or (b) has a HLB value in the range of from 5 to 12, preferably in the range of from 6 to 10, more preferably in the range of from 7 to 9. The term "lecithin" as used in the present text refers to a single substance as well as to a mixture of lecithins.

In particular, the composition according to the present invention is a surprisingly useful delivery agent for the delivery of substances selected from the group consisting of flavorants, vitamins, coloring foodstuffs, and polyunsaturated fatty acids.

Preferably
- said flavorant is selected from the group consisting of flavor oils (essential oils), and mixtures thereof, preferably the flavorant being a citrus oil or a mixture of flavor oils including citrus oil, and/or
- said polyunsaturated fatty acids are selected from the group consisting of omega-3 fatty acids and omega-6 fatty acids, and/or
- said vitamins are selected from the group consisting of vitamins A, D, E, and K, preferably the vitamin being vitamin E or a mixture of vitamins including vitamin E, and/or
- said coloring foodstuffs are selected from the group consisting of carotenoids, luteins, paprika extract, turmeric, and mixtures thereof, preferably the coloring foodstuff being carotene or a mixture of coloring foodstuffs including carotene.

Preferred (natural) flavor oils are selected from essential oils, for example those mentioned in Table 1 of U.S. Pat. No. 6,444,253 B1. Preferably the flavor oils are selected from the group consisting of: aniseed oil; basil oil; bergamot oil; bitter almond oil; camphor oil; lemon oil; eucalyptus oil; geranium oil; grapefruit oil; ginger oil; camomile oil; spearmint oil, caraway oil, lime oil; mandarin oil; clove (blossom) oil; orange oil; peppermint oil; rose oil; rosemary oil; sage oil; yarrow oil; star aniseed oil; thyme oil; vanilla extract; juniper berry oil; wintergreen oil; cinnamon leaf oil; cinnamon bark oil; and fractions thereof.

Preferred citrus oils are selected from the group consisting of: bergamot oil; lemon oil; grapefruit oil; lime oil; mandarin oil and orange oil.

In the compositions of the present invention the weight ratio of the total amount of saponin(s) to the total amount of lecithin (saponin(s) and lecithin being the only or at least relevant surfactants of the surfactant system of the composition) can be varied in a broad range. However, certain weight ratios are preferred. Preferably, the weight ratio of the total amount of saponin(s) to the total amount of lecithin is in the range of from 1:20 to 4:1, preferably in the range of from 1:10 to 2:1, more preferably in the range of from 1:5 to 1:1.

In the compositions of the present invention the weight ratio of the total amount of saponin(s) and lecithin to the total amount of substances selected from the group consisting of flavorants, vitamins, coloring foodstuffs, and polyunsaturated fatty acids can be varied in a broad range. However, certain weight ratios are preferred. Preferably the weight ratio of the total amount of saponin(s) and lecithin to the total amount of substances selected from the group consisting of flavorants, vitamins, coloring foodstuffs, and polyunsaturated fatty acids is in the range of from 1:15 to 8:1, preferably in the range of from 1:8 to 4:1, more preferably in the range of from 1:4 to 2:1.

In the compositions of the present invention the aqueous phase comprises one, two or more co-solvents selected from the group consisting of propylene glycol, ethanol, triacetin, and glycerol. The skilled person will select the co-solvent in particular under consideration of the substances comprised in the oil phase. Preferably, the co-solvent comprises both propylene glycol and glycerol, and preferably the weight ratio of the total amount of propylene glycol to the total amount of glycerol is in the range of from 1:5 to 2:1, preferably in the range of from 1:3 to 1:1, more preferably in the range of from 1:2 to 1:1.

The composition according to the present invention comprises optionally one, two or more sugars, preferably selected from the group consisting of sucrose, fructose, and glucose. The presence of said one, two or more sugars in the composition of the present invention is preferred. Preferably, the co-solvent in this case comprises both propylene glycol and glycerol. More preferably the weight ratio of the total amount of propylene glycol and glycerol to the total amount of sugars is in the range of from 1:3 to 5:3, preferably in the range of from 2:3 to 4:3, more preferably in the range of from 2:3 to 1:1.

Preferably, the one or more one, two or more sugars (carbohydrates) are chosen from the group consisting of sucrose, trehalose, lactose, maltose, melizitose, melibiose, raffinose, palatinose, lactulose, D-fructose, D-glucose, D-galactose, L-rhamnose, D-sorbose, D-mannose, D-tagatose, D-arabinose, L-arabinose, D-ribose, D-glyceraldehyde, maltodextrin and plant preparations containing one or more of the carbohydrates mentioned (preferably in a proportion of at least 5 wt. %, more preferably at least 15 wt. %), wherein these carbohydrates may also be present as a natural or artificially produced mixture (preferably honey, inverted sugar syrup, glucose syrup, highly enriched fructose syrups from maize starch [High Fructose Corn Syrup]).

A particularly preferred composition according to the in present invention comprises
(i) an aqueous phase comprising
  water,
  both propylene glycol and glycerol, wherein preferably the weight ratio of the total amount of propylene glycol to the total amount of glycerol is in the range of from 1:5 to 2:1, preferably in the range of from 1:3 to 1:1, more preferably in the range of from 1:2 to 1:1,
  one, two or more sugars selected from the group consisting of sucrose, fructose, and glucose,
(ii) a surfactant system comprising or consisting of one saponin or a mixture of two, three or more saponins, wherein the saponin or one, two, three or all saponins of said mixture are selected from the group consisting of quillaic saponins, and
  lecithin having a HLB value in range of from 5 to 12, preferably in the range of from 6 to 10, more preferably in the range of from 7 to 9, and
(iii) an oil phase comprising
  one, two, three or more substances selected from the group consisting of flavor oils, and mixtures thereof, preferably citrus oil or a mixture of flavor oils including citrus oil; vitamins, preferably vitamins selected from the group consisting of vitamins A, D, E and K; coloring foodstuffs, preferably selected from the group consisting of carotenoids, luteins, paprika extract, turmeric, and mixtures thereof; and polyunsaturated fatty acids, preferably selected from the group consisting of omega-3 fatty acids and omega-6 fatty acids.

The present invention also relates to a method of preparing a composition, preferably a composition according to the present invention, comprising the following steps:

preparing or providing a first component comprising one, two, three or more substances selected from the group consisting of flavorants, vitamins, coloring foodstuffs, and polyunsaturated fatty acids, and preparing or providing a second component comprising water, one, two or more co-solvents selected from the group consisting of propylene glycol, ethanol, triacetin, and glycerol, optionally one, two or more sugars, preferably selected from the group consisting of sucrose, fructose, and glucose, and one saponin or a mixture of two, three or more saponins, wherein additionally lecithin is present in the first and/or second component, mixing said first and second component, so that an intermediate composition is obtained, homogenizing said intermediate composition.

As to the substances used in the method of the present invention, all statements made above in the discussion of the composition according to the present invention apply mutatis mutandis.

The present invention also relates to compositions preparable according to the method of the present invention as described hereinbefore and hereinafter.

In a method of the present invention the lecithin can be part of the first and/or the second component. However, a method is preferred which comprises the following steps:

preparing or providing as first component a first solution or mixture by mixing lecithin, and one, two, three or more substances selected from the group consisting of flavorants, vitamins, coloring foodstuffs, and polyunsaturated fatty acids, preparing or providing as second component a first solution or mixture by mixing water, one, two or more co-solvents selected from the group consisting of propylene glycol, ethanol, triacetin, and glycerol, one, two or more sugars, preferably selected from the group consisting of sucrose, fructose, and glucose, and one saponin or a mixture of two, three or more saponins, mixing said first and second solutions or mixtures, respectively, so that an intermediate composition is obtained, homogenizing said intermediate composition.

The method according to the present invention comprises the step of homogenizing said intermediate composition. Preferably, said step of homogenizing is carried out using a high pressure homogenizer. The choice of the high pressure homogenizer is not of any particular relevance for the purposes of the present invention. However, commercially available high pressure homogenizers of the companies APV or NIRO SOAVI can be used. In the method of the present invention the high pressure homogenizer is preferably used such that the intermediate composition is homogenized at a pressure in the range of from 250 to 400/40 to 60 bar, preferably at 350/50 bar. Preferably, the number of cycles is in the range of from 2 to 8, preferably 3 to 5.

In a method of the present invention, preferably said flavorant is selected from the group consisting of flavor oils (essential oils), and mixtures thereof, preferably the flavorant being citrus oil or a mixture of flavor oils including citrus oil, and/or said polyunsaturated fatty acids are selected from the group consisting of omega-3 fatty acids and omega-6 fatty acids, and/or said vitamins are selected from the group consisting of vitamins A, D, E, and K, preferably the vitamin being vitamin E or a mixture of vitamins including vitamin E, and/or said coloring foodstuffs are selected from the group consisting of carotenoids, luteins, paprika extract, turmeric, and mixtures thereof, preferably the coloring foodstuff being carotene or a mixture of coloring foodstuffs including carotene.

In a preferred embodiment, the carotene used is beta-carotene.

With respect to the flavorants preferably comprised in the compositions and preferably employed in the methods of the present invention it has to be noted that preferably a natural citrus oil or a mixture of natural flavor oils comprising natural citrus oil are used.

In contrast to the situation described above with respect to prior art processes, the flavor oils preferably used in the compositions of the present invention and the methods of the present invention are preferably "unwashed".

The preferred method according to the present invention wherein a first solution or mixture is prepared as well as second solution or mixture is prepared can be carried out employing a wide range of temperatures in the respective steps. However, certain temperatures are preferred. In particular a method is preferred wherein said step of preparing said first solution or mixture is conducted at a temperature in the range of from 5 to 120° C., more preferably 20 to 100° C. and most preferably 20 to 30° C. and/or said step of preparing said second solution or mixture is conducted at a temperature in the range of from 5 to 98° C., preferably 10 to 80° C., and more preferably 10 to 40° C., and/or said step of mixing said first and second solutions or mixtures, respectively, so that an intermediate composition is obtained, is conducted at a temperature in the range of from 5 to 120° C., preferably 10 to 98° C., and more preferably from 10 to 40° C.

The present invention also relates to food formulation. A food formulation according to the present invention comprises a mixture of a composition of the present invention or a composition obtainable according to a method of the present invention, and additional components and/or amounts of ingredients present in said composition.

Herein, the term "additional components" relates to the situation that the food formulation comprises components (materials, substances) not already comprised in the composition. On the other hand, the term "additional amounts of ingredients present in that composition" relates to the situation where the composition already comprises a certain ingredient, but the food formulation comprises additional amounts of it, i.e. more of that ingredient than provided by the composition itself. E.g., a composition according to the present invention comprises water. In a typical situation a food formulation (e.g. a beverage) of the present invention will comprise additional amounts of water.

Preferably, the food formulation of the present invention is selected from the group consisting of
- beverages (optionally carbonated), preferably selected from the group consisting of lemonades, carbonated soft drinks, tea, ice-tea, beer-lemonade mixes, cola, beer-cola mixes, liqueur and whey drinks,
- concentrates for producing (optionally carbonated) beverages, preferably selected from the group consisting of lemonades, carbonated soft drinks, tea, ice-tea, beer-lemonade mixes, cola, beer-cola mixes, liqueur and whey drinks,
- non-beverage foods, preferably selected from the group consisting of water ice products, and table top sweeteners,
- concentrates for producing non-beverage foods, preferably for producing water ice products, and table top sweeteners.

Preferably, the food formulation of the present invention is liquid and/or clear, preferably liquid and clear.

Preferably, a food formulation, in particular a beverage, in accordance with the present invention has a turbidity of less than 5 FNU.

The term "liquid" in particular refers to 25° C. and 1013 mbar.

The food formulation of the present invention is based on a composition of the present invention or a composition which can be obtained by a method of the present invention. Thus, all statements made with respect to the composition or the method of the present invention also apply to the food formulation of the present invention, mutatis mutandis.

Food formulations according to the present invention preferably comprise one, two, three or more additional ingredients, preferably selected from the group consisting of:
antioxidants (preferably ascorbic acid), non-proteinogenic amino acids and allied compounds (preferably γ-aminobutyric acid, taurin), bitter substances (preferably quinine, caffeine, limonine, amarogentine, humolone, lupolone, catechol, tannins), mineral salts (preferably sodium chloride, potassium chloride, magnesium chloride, sodium phosphates), enzymatic browning-preventative substances (preferably sulfite, ascorbic acid), non-flavoring essential oils, trigeminally active substances or plant extracts containing such trigeminally active substances (e.g. trans-pellitorin, spilanthol), taste correcting agents, preferably chosen from the group consisting of: nucleotides (e.g.adenosine-5'-monophosphate, cytidine-5'-monophosphate) or their pharmaceutically acceptable salts, lactisoles, sodium salts (e.g. sodium chloride, sodium lactate, sodium citrate, sodium acetate, sodium gluconate), hydroxybenzoic amides according to DE 10 2004 041 496 (preferably 2,4-dihydroxybenzoic vanillylamide, 2,4-dihydroxybenzoic-N-(4-hydroxy-3-methoxybenzyl)amide, 2,4,6-trihydroxybenzoic-N-(4-hydroxy-3-methoxybenzyl)amide, 2-hydroxy-benzoic-N-4-(hydroxy-3-methoxybenzyl)amide, 4-hydroxybenzoic-N-(4-hydroxy-3-methoxybenzyl)amide, 2,4-dihydroxybenzoic-N-(4-hydroxy-3-methoxybenzyl)amide mono-sodium salt, 2,4-dihydroxybenzoic-N-2-(4-hydroxy-3-methoxyphenyl) ethylamide, 2,4-dihydroxybenzoic-N-(4-hydroxy-3-ethoxybenzyl)amide, 2,4-dihydroxybenzoic-N-(3,4-dihydroxybenzyl)amide and 2-hydroxy-5-methoxy-N-[2-(4-hydroxy-3-methoxyphenyl)ethyl]amide (aduncamide), 4-hydroxybenzoic vanillylamide), gamma-aminobutyric acid according to WO 2005/096841 for minimising or masking an unpleasant impression of taste such as bitterness), diacetyl trimers in accordance with WO 2006/058893 and WO 2007/141102 and/or divanillin as described in WO 2004/078302.

Food and preferably (carbonated) beverage formulations according to the present invention preferably comprise one, two or more additional ingredients selected from the group consisting of:
one or more sweeteners from the group consisting of sodium cyclamate, acesulfam K, sodium salt of saccharin, aspartame, superaspartame, neotam, alitam, sucralose, stevioside, rebaudioside and phyllodulcin,
one or more sugar alcohols chosen from the group consisting of erythritol, xylitol, sorbitol, mannitol, maltitol and isomaltitol,
one or more (organic) acids, preferably selected from the group consisting of malic acid, citric acid, tartaric acid, phosphoric acid, acetic acid, lactic acid, more preferably the organic acid(s) is or comprises citric acid.
one or more preservating agents, preferably selected from the group consisting of sorbates and benzoates and more preferably from potassium sorbate and/or sodium benzoate.

Further preferred food formulations comprising a composition according to the present invention are confectionaries, bakery products, and pastries. Particularly preferred are food formulations comprising a composition according to the present invention which in turn comprises a solubilization agent according to the present invention including one, two, three or more quillaic saponins. The use of quillaic saponins (i.e. one quillaic saponin or a mixture of two, three or more quillaic saponins) in a confectionary, a bakery product or in pastries, in particular as a solubilization agent for solubilizing polyphenols, flavonoids and/or diterpenoid glucosides in aqueous liquids for use in such a product, is a relevant aspect of the present invention. As to further details of this aspect of the present invention reference is made to the above discussion of food formulations according to the invention, which applies mutatis mutandis.

The invention is hereinafter further described by reference to the examples. Further aspects of the invention are stated in the attached claims. Unless indicated otherwise, all data, in particular percentages, refer to the weight.

EXAMPLES

As summarized in table 1, 13 microemulsion compositions according to the present invention were prepared, in each case containing an aqueous phase consisting of inverted sugar syrup and co-solvents like glycerol, propylene glycol, and ethanol. The inverted sugar syrup used was supplied by Südzucker, Germany, having a total solid content of 72° Brix (Bx). The syrup is a mixture of sucrose, glucose and fructose and is won by acidic hydrolysis.

The water content of each example is stated in table 1 and was calculated by referring to the total solid content of the sugar syrup and the quillaja extract.

Each microemulsion composition further comprises a surfactant system comprising or consisting of saponin in the form of quillaja extract, and lecithin. The quillaja extract used is Q-Naturale 200 (origin: National Starch, Bridgewater) with a saponin content >10% and a water content of 71.5%, while the lecithin used is Solec K-EML (origin: Solae Company), an enzyme-modified lecithin having an HLB of approximately 8.

In examples 7 and 8 saponin and lecithin are combined with sucrose palmitate in order to decrease the amount of quillaja extract in the system, which might be interesting to reduce raw material costs. A preferred sucrose ester, which was used in example 7 and 8, is P90 (origin: Compass Foods, Singapore) which was simply dissolved in the aqueous phase.

As oil phase, in examples 1-5 and 7-13 several flavour oils were chosen from the portfolio of Symrise and optionally blended with lecithin at room temperature. These flavour oils vary in terpene content and thus range from very unpolar (single fold oils, high terpene content) to less unpolar (50-fold, low terpene content). This allows for a judgement on the ability of the system to create clear microemulsions. Furthermore, different citrus oils were chosen to judge on the sensory performance of the system. Examples 9 and 10 contain orange lime oil, respectively, and showed very similar results regarding clarity and stability as the lemon products stated in table 1.

Tocopherol (origin: BASF, Ludwigshafen) was added to each flavour oil of the examples in order to protect the flavour from oxidation.

Example 6 contains a 30% beta-carotene suspension, dispersed in sunflower oil (origin: BASF, Ludwigshafen). In this case, the dispersion was heated to 120-140° C. for 20 minutes to dissolve the carotene crystals prior to their addition to the surfactant-containing aqueous phase.

All microemulsions were preemulsified using a high-shear mixer (origin: Ystral X10/20, Ystral, Germany) running for 5 minutes at 5000-8000 rpm. The resulting preemulsion was then homogenized for 5 passes at 350/50 bar using a 2-stage high pressure lab homogenizer (origin: Niro Soavi Lab 1000, Parma, Italy).

The microemulsions as such were clear to opaque ranging from 30 to 210 FNU (not indicated in table 1). An exception was the carotene microemulsion of example 6, which showed a dense and dark appearance in a beaker with a large diameter. But when using beakers with small diameter, it became obvious that the microemulsion of example 6 was clear as well, leading to perfectly clear beverages. Nevertheless, due to the extremely dark and dense color, a turbidity value could not be determined with the equipment available.

As the optical appearance of the microemulsions is of high interest when being applied to a soft drink, the focus lied on the turbidity values in the final beverage. Thus, table 1 only contains turbidity values of the microemulsions when applied in a soft drink. All microemulsions when applied in the soft drink showed FNU values between 1 and 5 FNU. If low surfactant concentrations were chosen, turbidity values usually were slightly higher, especially when combining them with rather unpolar flavorants, in comparison with those containing higher surfactant concentrations and/or low unpolar flavorant concentrations. As an example, the microemulsions of examples 2 and 3 contain the same amount of the same flavorant, but the microemulsion of example 3 is higher in lecithin concentration resulting in a lower turbidity value.

Microemulsions 1-13 were applied in different soft drink formulations according to table 2. The turbidity values of table 1 refer to beverage formulation A of table 2.

The beverages were tested at 4° C., 20° C. and 40° C. for 4 weeks. The results of this stability test have been compared to the test results of beverages using washed flavour oils instead of microemulsions. No significant difference could be detected. No beverages showed ringing or precipitation.

TABLE 1

| Material | 1 | 2 | 3 | 4 | 5 | 6 | 7 | 8 |
|---|---|---|---|---|---|---|---|---|
| Propylene glycol | 145 | 150 | 145 | 145 | 145 | 145 | 145 | 145 |
| Glycerol | 220 | 220 | 220 | 220 | 220 | 220 | 220 | 220 |
| Inverted sugar syrup 72° Bx | 565 | 565 | 560 | 540 | 545 | 545 | 580 | 560 |
| Q Naturale (*quillaja* extract)* | 30 | 30 | 30 | 50 | 50 | 50 | 10 | 30 |
| Solec K-EML lecithin | 10 | 5 | 15 | 15 | 10 | 10 | 10 | 10 |
| Sucrose Ester Palmitate | | | | | | | 5 | 5 |
| Lemon oil 5-fold | | | | 29.9 | | | 29.9 | 29.9 |
| Lemon oil 4-fold | | 29.9 | 29.9 | | | | | |
| Lemon oil 50-fold | | | | | 29.9 | | | |
| Lemon oil single-fold | 29.9 | | | | | | | |
| Carotene 30% in vegetable oil | | | | | | 29.5 | | |
| Antioxidant Tocopherol | 0.1 | 0.1 | 0.1 | 0.1 | 0.1 | 0.5 | 0.1 | 0.1 |
| Total | 1000 | 1000 | 1000 | 1000 | 1000 | 1000 | 1000 | 1000 |
| calculated water content | 17.96% | 17.96% | 17.83% | 18.70% | 18.84% | 18.84% | 16.95% | 17.83% |
| Turbidity of beverage FNU | 4.79 | 3.81 | 2.21 | 1.48 | 1.91 | 1.96 | 4.21 | 3.05 |

| Material | 9 | 10 | 11 | 12 | 13 |
|---|---|---|---|---|---|
| Ethanol | | | | | 365 |
| Propylene glycol | 145 | 145 | | 365 | |
| Glycerol | 220 | 220 | 365 | | |
| Inverted sugar syrup 72° | 540 | 540 | 540 | 540 | 540 |
| Q Naturale (*quillaja* extract)* | 50 | 50 | 50 | 50 | 50 |
| Solec K-EML lecithin | 15 | 15 | 15 | 15 | 15 |
| Sucrose Ester Palmitate | | | | | |
| orange oil 10-fold | 29.9 | | | | |
| lime oil 5-fold | | 29.9 | | | |
| lemon oil 5-fold | | | 29.9 | 29.9 | 29.9 |
| Carotene 30% in vegetable oil | | | | | |
| Antioxidant Tocopherol | 0.1 | 0.1 | 0.1 | 0.1 | 0.1 |
| Total | 1000 | 1000 | 1000 | 1000 | 1000 |
| calculated water content | 18.70% | 18.70% | 18.70% | 18.70% | 18.70% |
| Turbidity of beverage FNU | 1.14 | 1.49 | 2.88 | 3.43 | 1.53 |

TABLE 2

|  | g/l |
|---|---|
| Formulation Beverage A | |
| microemulsion of example 1-13 | 1.2 |
| Inverted sugar syrup 65° Bx | 138 |
| citric acid monohydrate cryst. | 2.2 |
| carbonated water | 891.6 |
| Total | 1033 |
| Formulation Beverage B | |
| microemulsion of example 1-13 | 1.2 |
| sweetener solution (aspartam, acesulfam, saccharin, cyclamate) | 6 |
| citric acid monohydrate cryst. | 2.2 |
| carbonated water | 993 |
| Total | 1002.4 |
| Formulation Beverage C | |
| microemulsion of example 1-13 | 1.2 |
| sucrose cryst. | 90 |
| citric acid monohydrate cryst. | 2.2 |
| carbonated water | 940 |
| Total | 1033 |
| Formulation Beverage D | |
| microemulsion of example 1-13 | 1.2 |
| fructose syrup 70° Bx | 107 |
| citric acid monohydrate cryst. | 2.2 |
| carbonated water | 918 |
| Total | 1028 |

The invention claimed is:

1. A composition comprising
   (i) an aqueous phase comprising
      water,
      one, two or more co-solvents selected from the group consisting of propylene glycol, ethanol, triacetin, and glycerol, and
      optionally one, two or more sugars,
   (ii) a surfactant system comprising
      one saponin or a mixture of two, three or more saponins, and
      lecithin,
      wherein the weight ratio of the total amount of saponins to the total amount of lecithin is in the range of from 1:20 to 4:1, and
   (iii) an of phase comprising
      one, two, three or more substances selected from the group consisting of flavorants, vitamins, coloring foodstuffs, and polyunsaturated fatty acids,
   wherein the composition does not comprise a polyglycerol fatty acid ester.

2. The composition according, to claim 1, wherein the composition is microemulsion.

3. The composition according to claim 2, wherein the composition is a clear or opaque microemulsion.

4. The composition according to claim 1, wherein the co-solvent is selected from the group consisting of propylene glycol and glycerol.

5. The composition according to claim 1, wherein said saponin or one, two, three or all saponins of said mixture are quintile saponins.

6. The composition according claim 1, wherein said lecithin is food-grade lecithin, which
   (a) is from soy-bean sources, and/or
   (b) has a HLB value in the range of from 5 to 12.

7. The composition according to claim 1, wherein
   said flavorant is selected from the group consisting of flavor oils (essential oils) and mixtures thereof, and/or
   said polyunsaturated fatty acids are selected from the group consisting of omega 3 and omega 6, and/or
   said vitamins are selected from the group consisting of vitamins A, D, E, and K, and/or
   said coloring foodstuffs are selected from the group consisting of carotenoids, luteins, paprika extract, turmeric, and mixtures thereof.

8. The composition of claim 7, wherein the flavor of is citrus oil or a mixture of flavor oils including citrus oil.

9. The composition according to claim 1, wherein the weight ratio of the total amount of saponins and lecithin to the total amount of substances selected from the group consisting of flavorants, vitamins, coloring foodstuffs, and polyunsaturated fatty acids is in the range of from 1:15 to 8:1.

10. The composition of claim 9, wherein the weight ratio of the total amount of saponins and lecithin to the total amount of substances selected from the group consisting of flavorants, vitamins, coloring foodstuffs, and polyunsaturated fatty acids is in the range of from 1:4 to 2:1.

11. The composition according to claim 1, wherein the co-solvent comprises both propylene glycol and glycerol, and wherein the weight ratio of the total amount of propylene glycol to the total amount of glycerol is in the range of from 1:5 to 2:1.

12. A method of preparing a composition according to claim 1, comprising:
   preparing or providing, a first component comprising
      one, two, three or more substances selected from the group consisting of flavorants, vitamins, coloring foodstuffs, and polyunsaturated fatty acids, and
   preparing or providing a second component comprising
      water,
      one, two or more co-solvents selected from the group consisting of propylene glycol, ethanol, triacetin, and glycerol,
      optionally one, two or more sugars, and
      one saponin or a mixture of two, three or more saponins, lecithin,
   wherein the lecithin is present in the first and/or second component,
   mixing said first and second component, so that an intermediate composition is obtained, and
   homogenizing said intermediate composition.

13. The method according to claim 12, wherein said step of homogenizing is carried out using a high pressure homogenizer.

14. A food formulation comprising a mixture of
   a composition according to claim 1, and
   additional components and/or additional amounts of ingredients present in said composition.

15. The food formulation according to claim 14, wherein the formulation is selected from the group consisting of
   beverages, and
   concentrates for producing beverages.

16. The food formulation according to claim 14, wherein the food formulation is liquid and/or clear.

17. The food formulation according to claim 14, wherein the formulation is selected from the group consisting of
   non-beverage foods, and
   concentrates for producing non-beverage foods.

18. The composition of claim 1, wherein the aqueous phase comprises one, two, or more sugars.

19. The composition of claim 18, wherein the one, two, or more sugars are selected from the group consisting of sucrose, fructose, and glucose.

* * * * *